(12) United States Patent
Wang

(10) Patent No.: US 11,345,265 B2
(45) Date of Patent: May 31, 2022

(54) CAR BACK SEAT COVER

(71) Applicant: HAINING MODERN CAR SEAT COVERS CO., LTD., Haining (CN)

(72) Inventor: Jian Wang, Haining (CN)

(73) Assignee: HAINING MODERN CAR SEAT COVERS, CO., LTD., Haining (CN)

( * ) Notice: Subject to any disclaimer, the term of this patent is extended or adjusted under 35 U.S.C. 154(b) by 0 days.

(21) Appl. No.: 16/882,397

(22) Filed: May 22, 2020

(65) Prior Publication Data

US 2021/0362635 A1    Nov. 25, 2021

(51) Int. Cl.
*B60N 2/60* (2006.01)
*B60N 2/28* (2006.01)

(52) U.S. Cl.
CPC .............. *B60N 2/6018* (2013.01); *B60N 2/28* (2013.01)

(58) Field of Classification Search
CPC ................................ B60N 2/6018; B60N 2/28
See application file for complete search history.

(56) References Cited

U.S. PATENT DOCUMENTS

| | | | |
|---|---|---|---|
| 9,845,033 B1 * | 12/2017 | Umlauf | B60N 2/6018 |
| 10,081,278 B1 * | 9/2018 | Balzer | B60N 2/60 |
| 10,960,798 B1 * | 3/2021 | Li | |
| 2018/0251054 A1 * | 9/2018 | Umlauf | |

\* cited by examiner

*Primary Examiner* — Anthony D Barfield
(74) *Attorney, Agent, or Firm* — Law Offices of Steven W. Weinrieb

(57) ABSTRACT

The present disclosure provides a seat cover for car back seats. The seat cover includes a back portion and a seat portion connected with the back portion. The back portion includes a first back unit configured to cover one back seat and a second back unit configured to cover another one back seat. The first back unit and the second back unit are in a detachable connection. A detachable gap is located between the first back unit and the second second back unit during the first back unit and the second back unit detached from each other. The detachable gap is used for the seat belt and the seat armrest protruding through. A protruding space is located between the first back unit and the second back unit, and the protruding space is configured to accommodate a seat belt and a seat armrest protruded out from the car back seats.

18 Claims, 5 Drawing Sheets

CAR BACK SEAT COVER

FIELD OF THE INVENTION

The present disclosure relates to the automotive technology field, and specifically to a seat cover for car back seats.

BACKGROUND OF THE INVENTION

With the improvement of living standard, private car ownership increases day by day, and more and more people use to drive out. At the same time, people pay more attention to the maintenance of their own cars, and car seat covers as an important car decoration and protector, are also popular with people. However, an existing seat cover for car back seats on the market usually cover the back seat simply, such that it is impossible to pull out seat belts or use a car seat armrest while the seat cover is in use. It also affects the installation and use of child safety seats and brings a lot of troubles to people. For this purpose, the present disclosure provides a seat cover for car back seats to solve the above problems.

SUMMARY OF THE INVENTION

In order to overcome the disadvantage of the existing seat cover for car back seats, the present disclosure provides a seat cover for car back seats, which has a simple structure and is easy to use, strong and durable.

The present disclosure adopts the following technical solution: a seat cover for car back seats including a back portion, a seat portion, at least one top connection element and a bottom cover portion, the back portion configured to cover back bodies of car back seats, the back portion comprising a first back unit configured to cover one back seat and a second back unit configured to cover another one back seat, the first back unit including a first upper side portion and a first lower side portion, the second back unit including a second upper side portion and a second lower side portion, the first upper side portion and the second upper side portion in a detachable connection, a detachable gap located between the first upper side portion and the second upper portion during the first upper side portion and the second upper side portion detached from each other, the detachable gap used for the seat belt and the seat armrest protruding through, a protruding space located between the first lower side portion and the second lower side portion, and the protruding space configured to accommodate a seat belt and a seat armrest protruded out from the car back seats; the seat portion configured to cover seat bodies of the car back seats, the seat portion connected with the back portion; the at least one top connection element connected with a top end of the back portion far away from the seat portion, and the least one top connection element configured to round at least one headrest of the back seat; the bottom cover portion connected with a bottom end of the seat portion far away from the back portion, and the bottom cover portion configured to cover bottom ends of the car back seats.

Further, the seat cover includes an insertion element configured to protrude through the protruding space and insert into a gap between a seat body and a back body of the back seat.

Further, the seat cover includes at least one fixing element connected between a side of the seat portion and a side of the bottom cover portion.

Further, the protruding space includes a first part and a second part, the first part and a second part disposed in parallel, the first part used for the seat belt protruding through, and the second part used for the seat armrest protruding through.

Further, the first back unit includes a first connection part connected with the seat portion, the sect cover further including at least one first detachable element located at a center of the first connection part, an end of the first detachable element connected with the first connection part, the other end of the first detachable element and the first connection part in a detachable connection such that the other end of the first detachable element being able to be detached away from the first connection part, a first opening formed during the other end of the first detachable element detached away from the first connection part, and the first opening used for a seat belt socket of the car back seats protruding through.

Further, the sect cover includes at least one second detachable element located at a side of the first connection part, an end of the second detachable element connected with the first connection part, the other end of the second detachable element and the first connection part in a detachable connection such that the other end of the second detachable element being able to be detached away from the first connection part, a second opening formed during the other end of the second detachable element detached away from the first connection part, and the second opening used for a detachable element of a child safety seat protruding through.

Further, the sect cover includes a first folding portion and a second folding portion, the first folding portion and the second folding portion configured to cover the protruding space, the first folding portion connected with a first lower side portion and configured to be folded to a back side of the first back unit, the second folding portion connected with a second lower side portion and configured to be folded to a back side of the second back unit.

Further, the first folding portion includes a third detachable element located at a top side of the first folding portion, the first folding portion and the first upper side portion in a detachable connection by the third detachable element.

Further, the second folding portion includes a fourth detachable element located at a top side of the second folding portion, the second folding portion and the second upper side portion in a detachable connection by the fourth detachable element.

Further, the first folding portion includes a fifth detachable element located at a bottom side of the first folding portion, the first folding portion and the seat portion in a detachable connection by the fifth detachable element.

Further, the second folding portion includes a sixth detachable element located at a bottom side of the second folding portion, the second folding portion and the seat portion in a detachable connection by the sixth detachable element.

The present disclosure also adopts the following technical solution: a seat cover for car back seats including a back portion and a seat portion connected with the back portion, the back portion configured to cover back bodies of car back seats, the back portion including a first back unit configured to cover a back body of one back seat and a second back unit configured to cover a back body of another one back seat, the first back unit and the second back unit in a detachable connection, a detachable gap located between the first back unit and the second second back unit during the first back unit and the second back unit detached from each other, the detachable gap used for the seat belt and the seat armrest protruding through, a protruding space located between the first back unit and the second back unit, and the protruding space configured to accommodate a seat belt and a seat armrest protruded out from the car back seats, the seat portion configured to cover seat bodies of the car back seats.

Further, the seat cover includes an insertion element configured to protrude through the protruding space and insert into a gap between the seat body and the back body of the back seat.

Further, the first back unit includes a first connection part connected with the seat portion, the sect cover further including at least one first detachable element located at a center of the first connection part, an end of the first detachable element connected with the first connection part, the other end of the first detachable element and the first connection part in a detachable connection such that the other end of the first detachable element being able to be detached away from the first connection part, a first opening formed during the other end of the first detachable element detached away from the first connection part, and the first opening used for a seat belt socket of the car back seats protruding through.

Further, the sect cover includes at least one second detachable element located at a side of the first connection part, an end of the second detachable element connected with the first connection part, the other end of the second detachable element and the first connection part in a detachable connection such that the other end of the second detachable element configured to be detached away from the first connection part, a second opening formed during the other end of the second detachable element detached away from the first connection part, and the second opening used for a detachable element of a child safety seat protruding through.

Further, the sect cover includes a first folding portion and a second folding portion, the first folding portion and the second folding portion configured to cover the protruding space, the first folding portion connected with a first back unit and configured to be folded to a back side of the first back unit, and the second folding portion connected with a second back unit and configured to be folded to a back side of the second back unit.

Further, the first folding portion includes a third detachable element located at a top side of the first folding portion, the first folding portion and the first back unit in a detachable connection by the third detachable element.

Further, the second folding portion includes a fourth detachable element located at a top side of the second folding portion, the second folding portion and the second back unit in a detachable connection by the fourth detachable element.

Further, the first folding portion includes a fifth detachable element located at a bottom side of the first folding portion, the first folding portion and the seat portion in a detachable connection by the fifth detachable element.

Further, the second folding portion includes a sixth detachable element located at a bottom side of the second folding portion, the second folding portion and the seat portion in a detachable connection by the sixth detachable element.

The present disclosure has the beneficial effects: the first back unit and the second back unit are in the detachable connection and define the detachable gap, the seat belt and the seat armrest can protrude though the detachable gap for use in order to bring conveniences to people, and the seat cover also has a complete and simple structure, attractive appearance, good user experience, reasonable design and ease to use.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE ILLUSTRATED EMBODIMENT

Figure 1:
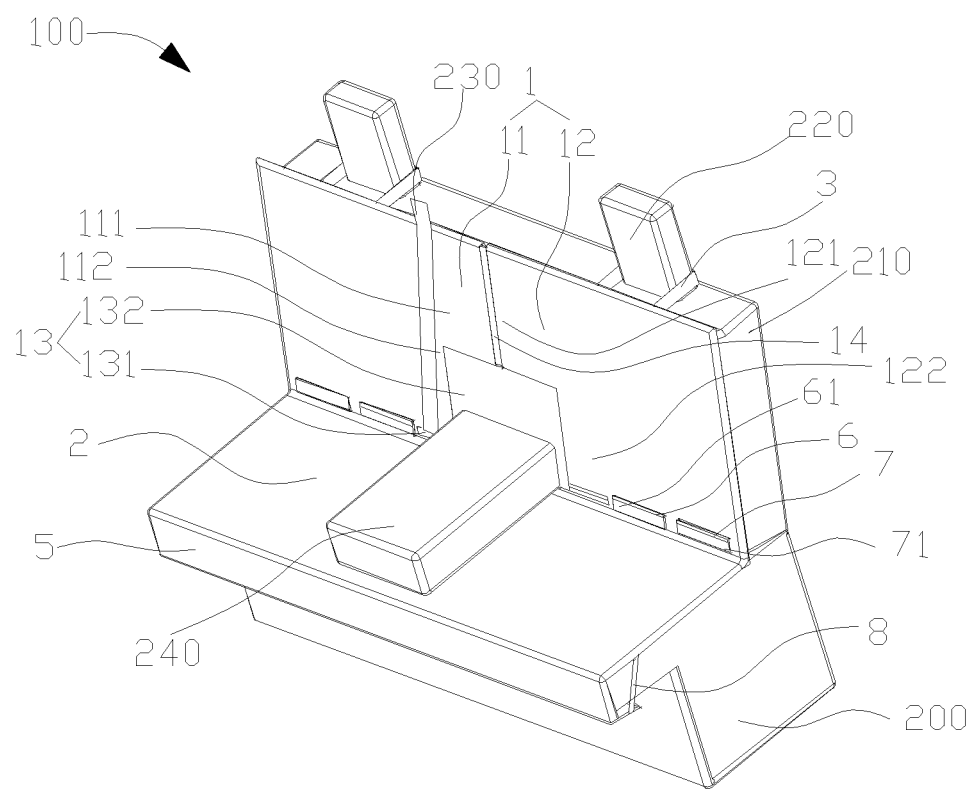
FIG. 1 is a schematic diagram of a seat cover for car back seats in a usage status according to one embodiment of the present disclosure.
Figure 2:
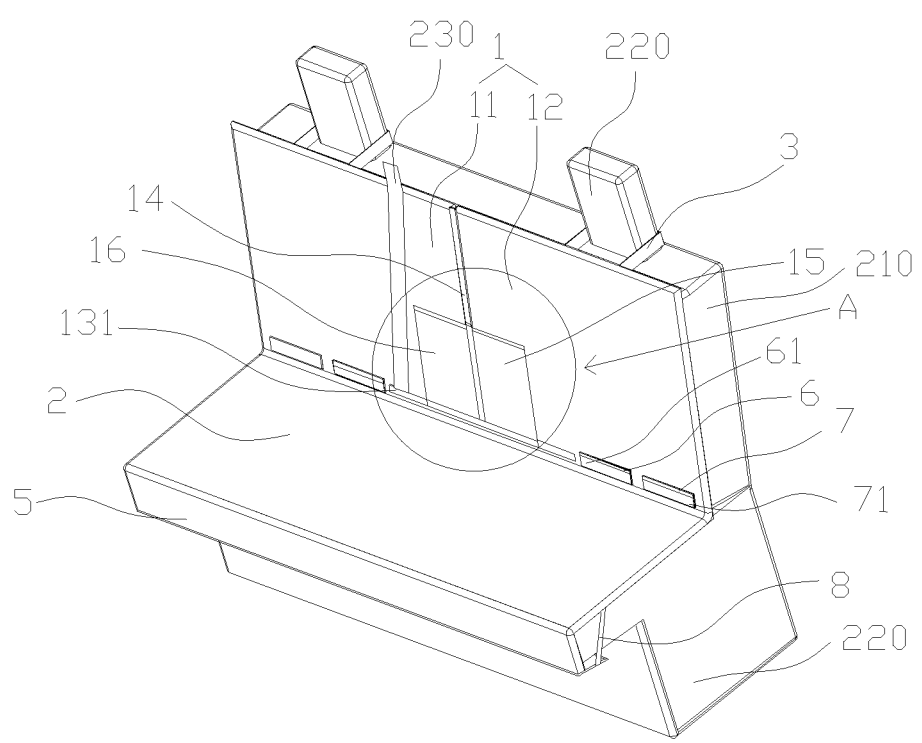
FIG. 2 is a schematic diagram of the seat cover of FIG. 1 in another usage status.
Figure 3:
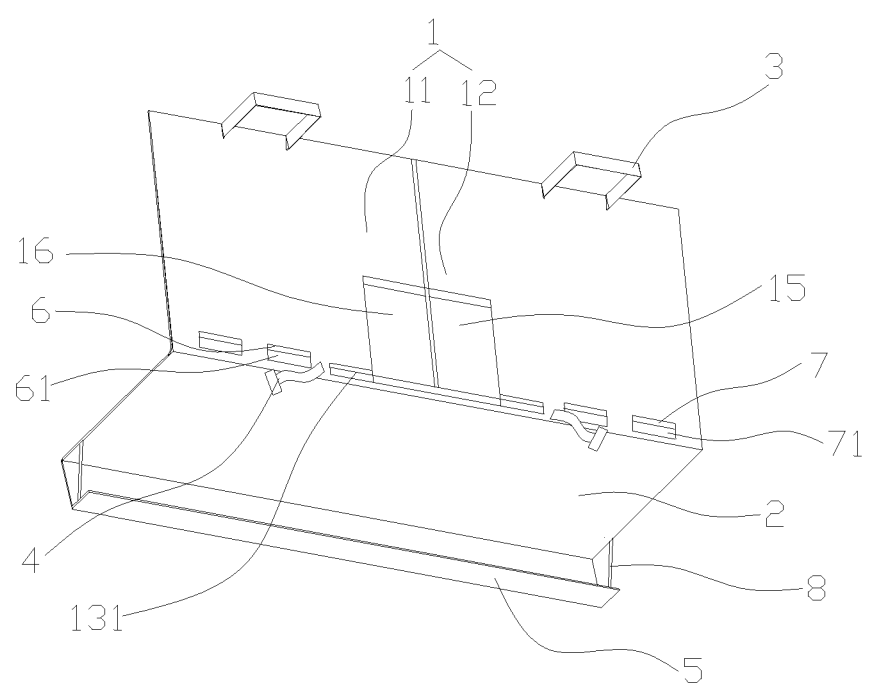
FIG. 3 is a partially enlarged view of A in FIG. 2.

FIG. 1 and FIG. 2 show a seat cover for car back seats in two different usage statuses according to one embodiment of the present disclosure, and FIG. 3 is a partially enlarged view of A in FIG. 2. The seat cover 100 is configured to cover a row of car back seats 200 which include two back seats 210 connected with each other, two headrests 220 connected with the two back seats 210, at least one seat belt 230 and a seat armrest 240 located between the two back seats. The seat cover 100 includes a back portion 1, a seat portion 2, two top connection elements 3, a bottom cover portion 5 and at least one fixing element 8.

The back portion 1 is connected with the seat portion 2. The back portion 1 includes a first back unit 11 configured to cover a back body of one back seat 210 and a second back unit 12 configured to cover a back body of another one back seat 220. One top connection element 3 is connected with a top end of the first back unit 11 and is configured to round one headrest 220. Another one top connection element 3 is connected with a top end the second back unit 12 and is configured to round another one headrest 220. The seat portion is connected with the back portion 1 and is configured to cover seat bodies of the back seats 210. The bottom cover portion 5 is connected with a bottom end of the seat portion 2 far away from the back portion 1, and the bottom cover portion 5 is configured to cover bottom ends of the two back seats 210. The fixing element 8 is connected between a side of the seat portion 2 and a side of the bottom cover portion 5 and can be an elastic fixing element. The elastic fixing element 8 is configured to fix the bottom cover portion 5 on the back seat 220 such that the bottom cover portion 5 can cover the bottom end of the seat portion 2 and the seat cover 100 can protect the car back seats 220.

The first back unit 11 includes a first upper side portion 111 and a first lower side portion 112. The second back unit 12 includes a second upper side portion 121 and a second lower side portion 122. The first upper side portion 111 and the second upper side portion 121 are in a detachable connection, and a detachable gap 14 is located between the first upper side portion 111 and the second upper portion 121 when the first upper side portion 111 and the second upper side portion 121 are detached from each other. The detachable gap 14 is used for the seat belt 230 and the seat armrest 240 protruding through, such that the seat belt 230 and the seat armrest 240 can protrude out from the back seat 220 for use. As mentioned, the first upper side portion 111 and the second upper side portion 121 are in the detachable connection and the seat belt 230 and the seat armrest 240 can protrude out from the back seat 220 for use such that the seat cover 100 has a complete and simple structure, attractive appearance, good user experience, reasonable design and ease to use.

A protruding space 13 is located between the first lower side portion 112 and the second lower side portion 122 in the usage status of FIG. 1, and the protruding space 13 is configured to accommodate the seat belt 230 and the seat armrest 240 protruded out from the car back seats 210. The protruding space 13 can include a first part 131 and a second part 132, and the two parts 131 and 132 are disposed in parallel. The first part 131 is used for the seat belt 230 protruding through, and the second part 132 is used for the seat armrest 240 protruding through such that the seat cover 100 has an attractive appearance and reasonable layout.

The seat cover 100 further includes a first folding portion 16 and a second folding portion 15, and the first folding portion 16 and the second folding portion 15 are configured to cover the protruding space 13 in the usage status of FIG. 2. The first folding portion 16 is connected with a first lower side portion 112 and can be folded to a back side of the first back unit 11 such that the first folding portion 16 is located at a first accommodate region between the first back unit 11 and the seat 210 during the usage status of FIG. 1. The second folding portion 15 is connected with a second lower side portion 112 and can be folded to a back side of the second back unit 12 such that the second folding portion 16 is located at a second accommodate region between the second back unit 12 and the seat 210 during the sage status of FIG. 1.

Further, the first folding portion 16 and the second folding portion 15 can be in a detachable connection. When the seat cover is in the usage status of FIG. 1, the first folding portion 16 is folded to the back side of the first back unit 11, and second first folding portion 15 is folded to the back side of the second back unit 12. When the seat cover is in the usage status of FIG. 2, the first folding portion 16 and the second folding portion 15 can be connected with each other such that the protruding space 13 is covered. As mentioned, the first folding portion 16 and the second folding portion 15 can be folded to the back side of the back portion 1 during the seat belt 230 and the seat armrest 240 protruding out from the back seat 220 for use, and the first folding portion 16 and the second folding portion 15 can be connected with each other to cover the protruding space 13 during the seat belt 230 and the seat armrest 240 not in use, such that the seat cover 100 has more simple structure, attractive appearance, reasonable design, ease to use and safety performance.

Figure 4:
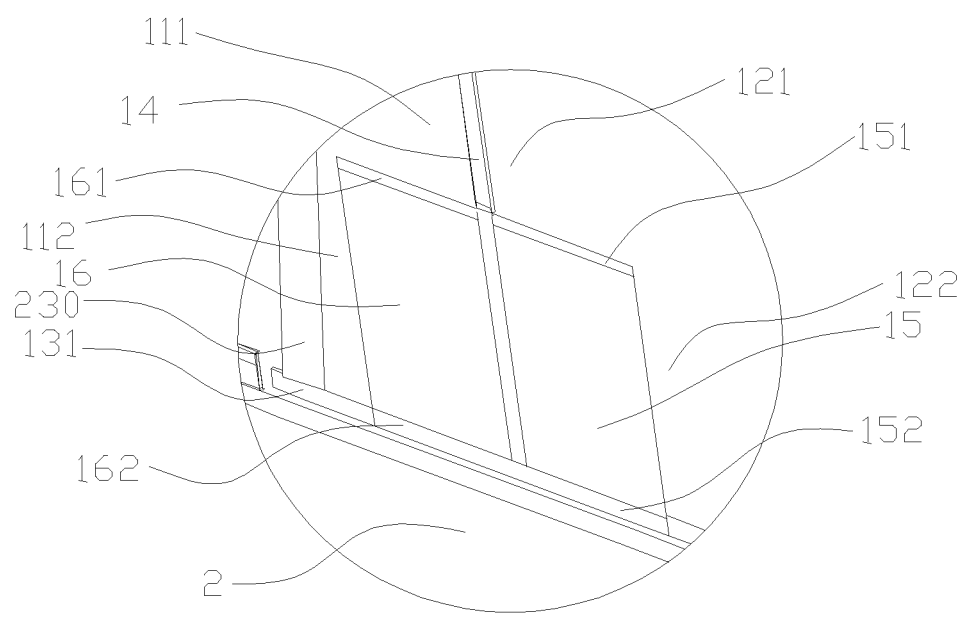
FIG. 4 is an angle schematic diagram of the seat cover of FIG. 1.

As shown in FIG. 4, the first back unit 11 further includes a first connection part 113 connected with the seat portion 2. The seat cover 100 further includes at least one first detachable element 6 located at a center of the first connection part 113. An end of the first detachable element 6 is connected with the first connection part 113, and the other end of the first detachable element 6 and the first connection part 113 are in a detachable connection such that the other end of the first detachable element 6 can be detached away from the first connection part 113. A first opening 61 is formed when the other end of the first detachable element 6 is detached away from the first connection part 113. The first opening 61 is used for a seat belt socket protruding through such that a plug of the seat belt 230 protruding out from the first part 131 can be inserted into the seat belt socket to use the seat belt easily and protect people. The first opening 61 can be covered by the first detachable element 6 when the seat belt 230 is not in use such that the back seat 220 can be protected. Furthermore, the first detachable element 6 and the first connection part 113 have simple structure, reasonable design and ease to use.

The second back unit 12 further includes a second connection part 114 connected with the seat portion 2. The seat cover 100 further includes at least one second detachable element 7 located at a side of the second connection part 114. An end of the second detachable element 7 is connected with the second connection part 114, and the other end of the second detachable element 7 and the second connection part 114 are in a detachable connection such that the other end of the second detachable element 7 can be detached away from the second connection part 114. A second opening 71 is formed when the other end of the second detachable element 7 is detached away from the second connection part 114. The second opening 71 is used for a detachable element of a child safety seat protruding through such that the child safety seat can be installed and used easily to protect children. The second opening 71 can be covered by the second detachable element 7 when the seat belt 230 is not in use such that the back seat 220 can be protected. Furthermore, the second detachable element 7 and the second connection part 114 have simple structure, reasonable design and ease to use.

The first folding portion 16 further includes a third detachable element 161 located at a top side of the first folding portion 16. The first folding portion 16 and the first upper side portion 111 are in a detachable connection by the third detachable element 161. As such, the first folding portion 16 and the first upper side portion 111 can be connected by the third detachable element 161 to avoid debris pollutes or scratches the back seat through a gap between the first folding portion 16 and the first upper side portion 111, and the third detachable element 161 has simple structure, reasonable design and ease to use.

The second folding portion 15 further includes a fourth detachable element 151 located at a top side of the second folding portion 15. The second folding portion 15 and the second upper side portion 112 are in a detachable connection by the fourth detachable element 151. As such, the second folding portion 15 and the second upper side portion 112 can be connected by the fourth detachable element 151 to avoid debris pollutes or scratches the back seat through a gap between the second folding portion 15 and the second upper side portion 112, and the fourth detachable element 151 has simple structure, reasonable design and ease to use.

The first folding portion 16 further includes a fifth detachable element 162 located at a bottom side of the first folding portion 16. The first folding portion 16 and the seat portion 2 are in a detachable connection by the fifth detachable element 162. As such, the first folding portion 16 and the seat portion 2 can be connected by the fifth detachable element 162 to avoid debris pollutes or scratches the back seat through a gap between the first folding portion 16 and the seat portion 2, and the fifth detachable element 162 has simple structure, reasonable design and ease to use.

The second folding portion 15 further includes a sixth detachable element 151 located at a bottom side of the second folding portion 15. The second folding portion 15 and the seat portion 2 are in a detachable connection by the sixth detachable element 152. As such, the second folding portion 15 and the seat portion 2 can be connected by the sixth detachable element 151 to avoid debris pollutes or scratches the back seat through a gap between the second folding portion 15 and the seat portion 2, and the sixth detachable element 151 has simple structure, reasonable design and ease to use.

Figure 5:
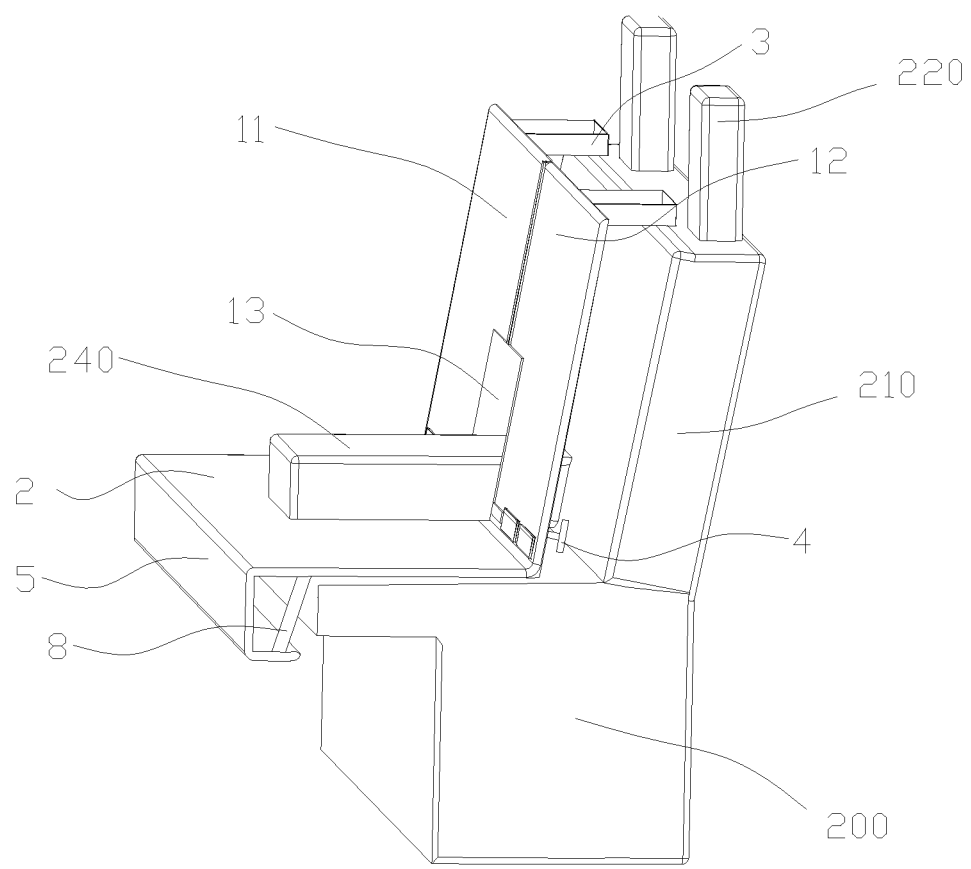
FIG. 5 is another angle schematic diagram of the seat cover of FIG. 4.

As shown in FIG. 4 and FIG. 5, the seat cover 100 further includes an insertion element 4, and the insertion element 4 can protrude through the second part 132 and insert into a gap between a seat body and a back body of the back seat 220. As such, the seat cover 100 can be connected with the back seat 220 closely and the insertion element 4 has simple structure, reasonable design and ease to use.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. A seat cover for car back seats, comprising:
a back portion configured to cover back bodies of car back seats, the back portion comprising a first back unit configured to cover a back body of one back seat and a second back unit configured to cover a back body of another one back seat, the first back unit comprising a first upper side portion and a first lower side portion, the second back unit comprising a second upper side portion and a second lower side portion, the first upper side portion and the second upper side portion in a detachable connection, a detachable gap located between the first upper side portion and the second upper portion during the first upper side portion and the second upper side portion detached from each other, the detachable gap used for the seat belt and the seat armrest protruding through, a protruding space located between the first lower side portion and the second lower side portion, and the protruding space configured to accommodate a seat belt and a seat armrest protruded out from the car back seats;
a seat portion configured to cover seat bodies of the car back seats, and the seat portion connected with the back portion;
at least one top connection element connected with a top end of the back portion far away from the seat portion, and the least one top connection element configured to round at least one headrest of the back seat;
a bottom cover portion connected with a bottom end of the seat portion far away from the back portion, and the bottom cover portion configured to cover bottom ends of the car back seats; and
wherein the seat cover further comprises a first folding portion and a second folding portion, the first folding portion and the second folding portion configured to cover the protruding space, the first folding portion connected with a first lower side portion and configured to be folded to a back side of the first back unit, the second folding portion connected with a second lower side portion and configured to be folded to a back side of the second back unit.

2. The seat cover according to claim 1, wherein the seat cover further comprises an insertion element configured to protrude through the protruding space and insert into a gap between the seat body and the back body of the back seat.

3. The seat cover according to claim 1, wherein the seat cover further comprises at least one fixing element connected between a side of the seat portion and a side of the bottom cover portion.

4. The seat cover according to claim 1, wherein the protruding space comprises a first part and a second part, the first part and a second part disposed in parallel, the first part used for the seat belt protruding through, and the second part used for the seat armrest protruding through.

5. The seat cover according to claim 1, wherein the first back unit comprises a first connection part connected with the seat portion, the sect cover further comprising at least one first detachable element located at a center of the first connection part, an end of the first detachable element connected with the first connection part, the other end of the first detachable element and the first connection part in a detachable connection such that the other end of the first detachable element being able to be detached away from the first connection part, a first opening formed during the other end of the first detachable element detached away from the first connection part, and the first opening used for a seat belt socket of the car back seats protruding through.

6. The seat cover according to claim 5, wherein the sect cover further comprises at least one second detachable element located at a side of the first connection part, an end of the second detachable element connected with the first connection part, the other end of the second detachable element and the first connection part in a detachable connection such that the other end of the second detachable element being able to be detached away from the first connection part, a second opening formed during the other end of the second detachable element detached away from the first connection part, and the second opening used for a detachable element of a child safety seat protruding through.

7. The seat cover according to claim 1, wherein the first folding portion further comprises a third detachable element located at a top side of the first folding portion, the first folding portion and the first upper side portion in a detachable connection by the third detachable element.

8. The seat cover according to claim 1, wherein the second folding portion further comprises a fourth detachable element located at a top side of the second folding portion, the second folding portion and the second upper side portion in a detachable connection by the fourth detachable element.

9. The seat cover according to claim 1, wherein the first folding portion further comprises a fifth detachable element located at a bottom side of the first folding portion, the first folding portion and the seat portion in a detachable connection by the fifth detachable element.

10. The seat cover according to claim 1, wherein the second folding portion further comprises a sixth detachable element located at a bottom side of the second folding portion, the second folding portion and the seat portion in a detachable connection by the sixth detachable element.

11. A seat cover for car back seats, comprising:
a back portion configured to cover back bodies of car back seats, the back portion comprising a first back unit configured to cover a back body of one back seat and a second back unit configured to cover a back body of another one back seat, the first back unit and the second back unit in a detachable connection, a detachable gap located between the first back unit and the second back unit during the first back unit and the second back unit detached from each other, the detachable gap used for the seat belt and the seat armrest protruding through, a protruding space located between the first back unit and the second back unit, and the protruding space configured to accommodate a seat belt and a seat armrest protruded out from the car back seats;

a seat portion configured to cover seat bodies of the car back seats, and the seat portion connected with the back portion; and wherein the seat cover further comprises a first folding portion and a second folding portion, the first folding portion and the second folding portion configured to cover the protruding space, the first folding portion connected with a first back unit and configured to be folded to a back side of the first back unit, the second folding portion connected with a second back unit and configured to be folded to a back side of the second back unit.

12. The seat cover according to claim 11, wherein the seat cover further comprises an insertion element configured to protrude through the protruding space and insert into a gap between the seat body and the back body of the back seat.

13. The seat cover according to claim 11, wherein the first back unit comprises a first connection part connected with the seat portion, the seat cover further comprising at least one first detachable element located at a center of the first connection part, an end of the first detachable element connected with the first connection part, the other end of the first detachable element and the first connection part in a detachable connection such that the other end of the first detachable element being able to be detached away from the first connection part, a first opening formed during the other end of the first detachable element detached away from the first connection part, and the first opening used for a seat belt socket of the car back seats protruding through.

14. The seat cover according to claim 13, wherein the seat cover further comprises at least one second detachable element located at a side of the first connection part, an end of the second detachable element connected with the first connection part, the other end of the second detachable element and the first connection part in a detachable connection such that the other end of the second detachable element being able to be detached away from the first connection part, a second opening formed during the other end of the second detachable element detached away from the first connection part, and the second opening used for a detachable element of a child safety seat protruding through.

15. The seat cover according to claim 11, wherein the first folding portion further comprises a third detachable element located at a top side of the first folding portion, the first folding portion and the first back unit in a detachable connection by the third detachable element.

16. The seat cover according to claim 11, wherein the second folding portion further comprises a fourth detachable element located at a top side of the second folding portion, the second folding portion and the second back unit in a detachable connection by the fourth detachable element.

17. The seat cover according to claim 11, wherein the first folding portion further comprises a fifth detachable element located at a bottom side of the first folding portion, the first folding portion and the seat portion in a detachable connection by the fifth detachable element.

18. The seat cover according to claim 11, wherein the second folding portion further comprises a sixth detachable element located at a bottom side of the second folding portion, the second folding portion and the seat portion in a detachable connection by the sixth detachable element.

* * * * *